United States Patent [19]

D'Alessandro

[11] Patent Number: 4,627,515
[45] Date of Patent: Dec. 9, 1986

[54] EXHAUST DEVICE

[76] Inventor: Luigi D'Alessandro, Geerenstrasse 12, CH-8157 Dielsdorf, Switzerland

[21] Appl. No.: 765,260

[22] Filed: Aug. 13, 1985

Related U.S. Application Data

[63] Continuation-in-part of Ser. No. 659,085, Oct. 1, 1984, abandoned.

[51] Int. Cl.⁴ ............................................. F01N 1/10
[52] U.S. Cl. .................................... 181/258; 181/269
[58] Field of Search ............... 181/217, 238, 239, 241, 181/247, 251, 252, 255, 250, 258, 269, 275, 276, 268

[56] References Cited

U.S. PATENT DOCUMENTS

| | | | |
|---|---|---|---|
| 1,521,074 | 12/1924 | Carr | 181/227 |
| 2,112,534 | 3/1938 | Keen | 181/238 X |
| 2,558,023 | 6/1951 | Walsh | 138/89 X |
| 3,960,509 | 6/1976 | Abriany | 181/241 X |

FOREIGN PATENT DOCUMENTS

| | | |
|---|---|---|
| 345300 | 11/1904 | France . |
| 366275 | 10/1906 | France . |
| 2408721 | 6/1979 | France . |
| 1206105 | 9/1970 | United Kingdom . |

Primary Examiner—Benjamin R. Fuller
Attorney, Agent, or Firm—Marmorek, Guttman & Rubenstein

[57] ABSTRACT

Exhaust device wherein the exhaust gas from the engine is not directly exhausted to the ambient air. The free end of the exhaust pipe is closed and openings are arranged in the mantle of the pipe in the area of the free end. The openings are directed to the road side. Openings are also provided in the exhaust pipe within the housing of the exhaust device. Additional filters are mounted in the container to purify the exhaust gas. The container is provided with an inner wall or coating along the mantle surface to improve sound damping. The simple construction of the proposed exhaust device makes its manufacture inexpensive. Furthermore, its contribution to the protection of the environment is considerable.

8 Claims, 2 Drawing Figures

EXHAUST DEVICE

This is a continuation-in-part of application Ser. No. 659,085, filed Oct. 1, 1984, now abandoned.

The present invention relates to an exhaust device for motor vehicles, including an arrangement of tubes surrounded by a housing, wherein the end regions of the tubes project diametrically from the housing so that one tube end is connectable to the motor, and at least a further tube end projects from the side of the housing facing away from the motor.

Known exhaust container devices include a practically smooth passage for exhaust gases being discharged from internal combustion engines. In such devices, the exhaust gases pass directly through the open end of the exhaust tube to the surrounding air.

It is the object of the present invention to propose an exhaust device, which includes suitable means for, on one hand, damping sound and, on the other hand, for cleansing, so as to prevent a direct contamination of the surroundings. Furthermore, the present device is inexpensive and simple to construct.

This object is attained, according to the invention, by providing an exhaust device comprising a housing having a wall defining an interior and exterior, and a tube for transporting the exhaust gases, a portion of the tube being inside the housing and a portion of the tube being outside the housing. The portion of the tube outside the housing is closed off at its end and has peripheral holes. A filter is also provided which filters the exhaust gas before it is discharged. In a preferred embodiment, the portion of the tube inside the housing also has peripheral openings and a second filter arrangement is disposed along the wall of the container.

Further advantageous embodiments of the invention are described below.

Preferred embodiments of the inventive exhaust container are shown in the Figures, and are described in more detail in what follows.

DETAILED DESCRIPTION

Figure 1:
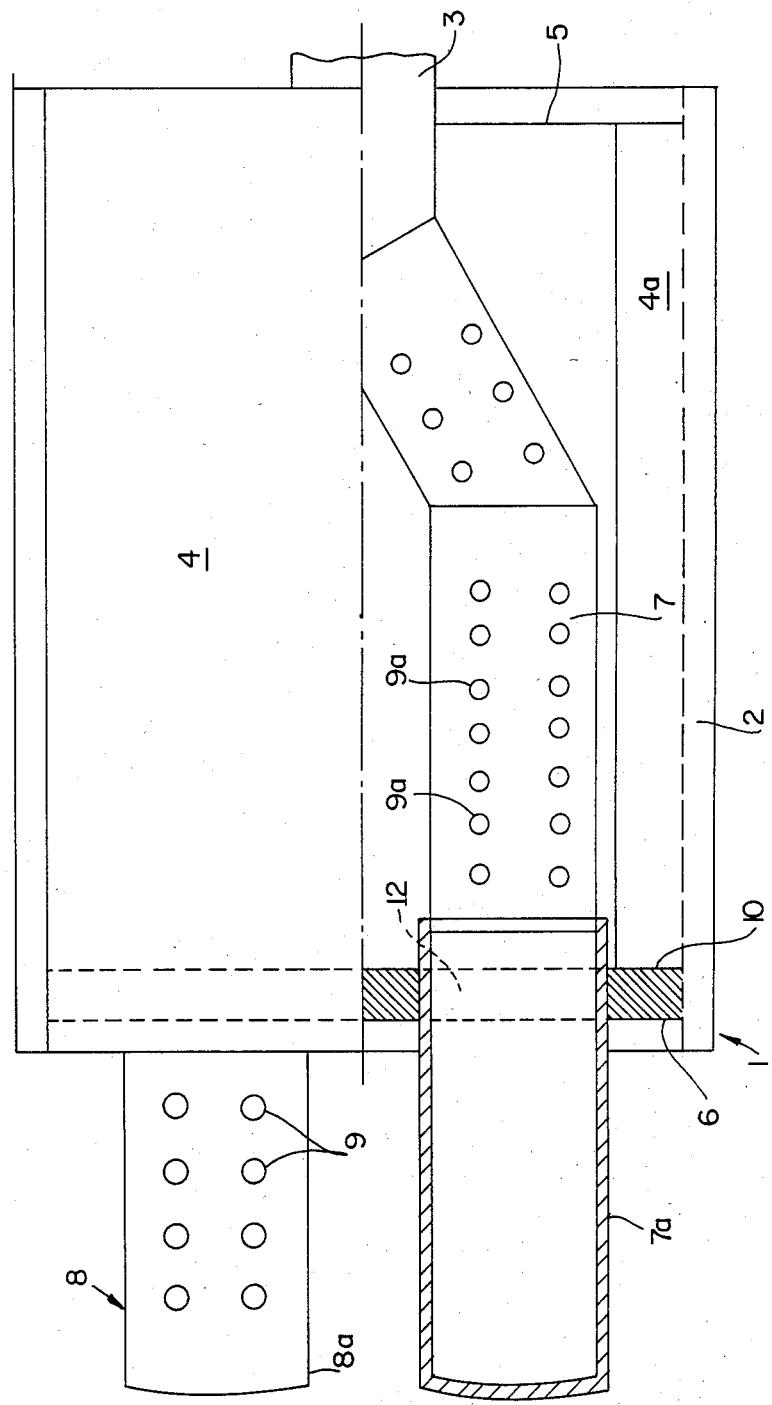
FIG. 1 is a cross-sectional view of a first embodiment of the invention.

In FIG. 1 an exhaust device 1 is illustrated partly in section. An arrangement of tubes 7, 8 is enclosed within a housing 2, which tubes communicate with a (non-illustrated) motor by means of the tube 3. The housing 2 includes a peripheral wall 4, which can also consist of two parts, which are then welded or flanged to one another. The housing is then closed off at both ends by means of walls 5 and 6, the walls being formed with openings so as to provide passages for the tubes.

Tubes 7 and 8 are welded to the tube 3 within the housing in the form of a branch, and which, in turn, consist of several parts. The end regions 7a and 8a of both tubes are closed off at their respective ends, and are formed with openings facing the road side. The tubes 7, 8 also have peripheral holes 9a on the portions inside housing 2. Holes 9a are smaller than holes 9. These openings serve as an exhaust for the exhaust gases being discharged from the motor. These may be disposed in parallel rows, or may be arranged so as to be offset from one another. The openings are preferably circular. In tests it has been shown that optimal results were achieved with eight openings. The diameter of the openings may be changed.

A further wall 10 may be disposed parallel to the wall 6 of the housing 2. These walls define a chamber about the tubes 7 and 8. A filter arrangement 12 is provided within this chamber, which serves for the cleansing of the exhaust gases being discharged. Glasswool may be additionally used for reinforcing the cleansing effect. Additionally the filter arrangement may include ceramic parts and/or metal chips. The wall 4 of the housing 2 includes a lining 4a, acting as damper of sound. This lining may consist of glass wool, or of another suitable material.

Figure 2:
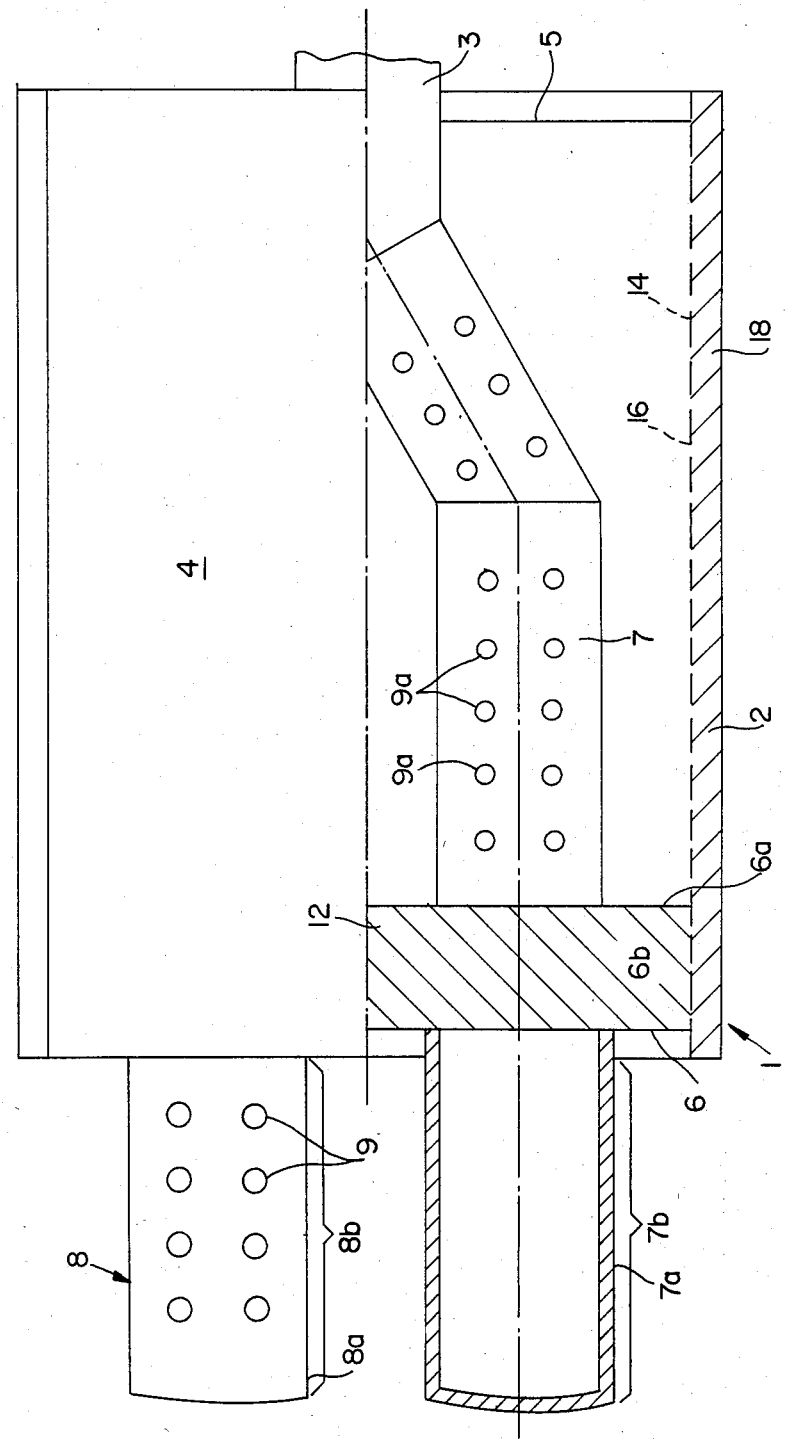
FIG. 2 is a cross-sectional view of a second embodiment of the invention.

In FIG. 2 another implementation variant of the exhaust container device described consists therein, that the tubes do not extend from the motor through the container in a through-going manner. Here a chamber is formed by the wall 6 of the container and a wall 6a spaced therefrom. A filter arrangement 12 is provided therein. The wall 6a is preferably perforated, so as to favor circulation of the gases. The tube ends are secured to the respective walls by means of a welding contruction.

In this embodiment, holes 9a extend along the tubes 7, 8 inside housing 2. Holes 9a are smaller than holes 9. Additionally, an inner wall 14 is provided having perforations 16. A filtering arrangement made from glass wool or another suitable material is located between wall 4 and inner wall 14.

Herein, the gases expelled by the motor enter tube 3. The gas stream does not undergo laminar flow, but is divided into many turbulent streams due to the holes 9a. These streams pass out of holes 9a and through the perforations in wall 6a to be filtered in chamber 6b before exiting the tube. Additionally, the turbulent streams may pass through perforations 16 in inner wall 14 to be filtered by arrangement 18 before passing through the perforations in wall 6a. Inasmuch as the first part of tube 7 is not coaxial with housing 2, the gas stream strikes holes 9a at an angle. This further increases the turbulence created.

The turbulence is advantageous to the operation of the exhaust device. The turbulence has a tendency to reduce the noise (since the speed of the turbulent gas is lower than for a laminar stream), increase the efficiency of the filtering (because of reduced speed), and reduce the temperature of the exhaust device.

By using the implementation versions of an exhaust device, such as have been described, a significant contribution can be made towards protecting the surroundings.

I claim:

1. An exhaust device for transporting exhaust gases of a motor vehicle, comprising
   a housing having a wall defining an interior and an exterior,
   a tube, for transporting said gases, a portion of said tube within said housing and a portion of said tube outside said housing, the portion of said tube outside said housing being closed at its end and having at least one aperture around its periphery, the portion of said tube within said housing also having at least one aperture around its periphery,
   a filter in fluid communication with the interior of said tube, and a second filter in fluid communication with the interior of said tube, said second filter being disposed along the interior wall of said housing.

2. The exhaust device of claim 1 wherein said housing further comprises an inner wall, said inner wall having at least one aperture therein, and wherein said second filter is disposed between said inner wall and said wall of said housing.

3. The exhaust device of claim 1 wherein said tube comprises two branches.

4. The exhaust device of claim 1 wherein said filters contain filling elements selected from the group consisting of metal, ceramics, and mixtures thereof.

5. The exhaust device of claim 1 wherein said filters contain glass wool.

6. The exhaust device of claim 1 wherein said aperture in said tube portion outside said housing is directed downward.

7. The exhaust device of claim 1 wherein said apertures are circular.

8. The exhaust device of claim 1 wherein the aperture in the portion of said tube inside said housing is smaller than the aperture in the portion of said tube outside said housing.

* * * * *